US009113504B1

(12) United States Patent
Hamasaki

(10) Patent No.: US 9,113,504 B1
(45) Date of Patent: Aug. 18, 2015

(54) PORTABLE LIGHTING DEVICE

(76) Inventor: Noriaki Hamasaki, Costa Mesa, CA (US)

( * ) Notice: Subject to any disclaimer, the term of this patent is extended or adjusted under 35 U.S.C. 154(b) by 1000 days.

(21) Appl. No.: 13/240,905

(22) Filed: Sep. 22, 2011

(51) Int. Cl.
*B62J 6/00* (2006.01)
*H05B 37/02* (2006.01)
*B60Q 1/14* (2006.01)
*B60Q 1/26* (2006.01)

(52) U.S. Cl.
CPC *H05B 37/02* (2013.01); *B60Q 1/14* (2013.01); *B62J 6/00* (2013.01); *B60Q 1/2673* (2013.01)

(58) Field of Classification Search
CPC ... G08G 1/144; G08G 1/166; H05B 33/0842; H05B 33/0845; H05B 33/0857; H05B 37/02; H05B 33/0803; B60Q 1/00; B60Q 1/26; B60Q 1/14; B60Q 1/2673; B62J 6/00; B62J 6/02
USPC ............... 315/224, 291, 307, 185 R, 294, 31; 362/473–476, 543–547; 340/432, 438, 340/463–464
See application file for complete search history.

(56) References Cited

U.S. PATENT DOCUMENTS

| | | | |
|---|---|---|---|
| 6,402,165 B1* | 6/2002 | Redmond | 280/18.1 |
| 8,651,714 B1* | 2/2014 | Hamasaki | 362/473 |
| 2004/0113385 A1* | 6/2004 | Uno | 280/260 |
| 2008/0068825 A1* | 3/2008 | Harris | 362/105 |
| 2008/0211428 A1* | 9/2008 | Bayat et al. | 315/299 |
| 2009/0058315 A1* | 3/2009 | Baeumle | 315/291 |
| 2011/0253139 A1* | 10/2011 | Guthrie et al. | 128/203.14 |

* cited by examiner

*Primary Examiner* — Tung X Le
*Assistant Examiner* — Amy Yang

(57) ABSTRACT

The present disclosure is directed to a portable lighting device having an external switch configured to allow a user to control and/or configure the functionality portable lighting device while the light is in use and without the need for extra equipment. In one aspect, a portion of a switch may be configured to control some functionality provided by the light, while another portion of the switch may be configured to control the remaining functions. In another aspect, the circuit board may include a microcontroller which includes an electrically erasable programmable read-only memory (EEPROM). Advantageously, the EEPROM may function to save any settings and/or modes configured by the user such that the settings/modes do not need to be reset after the portable lighting device is turned off and then back on.

16 Claims, 14 Drawing Sheets

TO CHARGER

Setting 1 → Setting 2 → Setting 3 → Setting 4 → Setting 5

FIG. 5A

| SETTING NUMBER | SETTING #1 | SETTING #2 | SETTING #3 | SETTING #4 | SETTING #5 |
|---|---|---|---|---|---|
| SETTING NAME | STEADY | ZOOM | TRIPLE | SINGLE | RANDOM |
| SETTING DESCRIPTION | HI-LED IS CONSTANTLY ON | HI-LED GRADUALLY DIMS THEN BRIGHTENS PER CYCLE | HI-LED FLASHES THREE TIMES CONSECUTIVELY PER CYCLE | HI-LED FLASHES ONCE PER CYCLE | HI-LED FLASHES MULTIPLE TIMES WITH A DIM OUTPUT AND ONCE IN A HIGH OUTPUT PER CYCLE |
| TUNING DESCRIPTION | CHANGE BRIGHTNESS | CHANGE SPEED OF THE DUTY CYCLE | CHANGE SPEED OF THE DUTY CYCLE | CHANGE TIME BETWEEN CONSECUTIVE FLASHES | CHANGE NUMBER OF HIGH OUTPUT FLASHES PER CYCLE |

FIG. 5B

PORTABLE LIGHTING DEVICE

BACKGROUND OF THE INVENTION

1. Field of the Invention

The present disclosure is directed to a portable lighting device suitable for the general public. For example, a cyclist may benefit from the use of the portable lighting device to ensure that he/she is visible to nearby pedestrians, other riders or motorists.

2. Description of Related Art

There are approximately a billion bicycles in existence in the world today. Each year, over a hundred million new bicycles are produced. The people that own and ride these bicycles range from recreation riders peddling for pleasure or health, professional riders racing for a career, or individuals who ride a bicycle as a primary form of transportation. Accordingly, the bicycling industry is constantly improving available technology so that riders can use their bicycles more efficiently, more safely and the like.

Conceivably, a substantial segment of bike riders use their bicycles after dark. Indeed, bicycle lighting remains an important aspect of bike riding. A good bicycle light serves many functions. For example, riders who otherwise would be afraid of being struck by a vehicle because they are not visible in the dark may be encouraged to ride at night. Alternatively, some riders who use bicycles as a form of transportation may be able to pursue jobs that require travel at night. The possibilities that a bicycle light provides a rider may be endless.

Bicycle light technology has been improving in recent years. More particularly, light-emitting diodes (LEDs) have become more and more popular with bike enthusiasts because they increase lighting at a reduced size and weight. However, current bicycle lights powered by LEDs are still lacking in functionality. For example, as darkness falls, it would be advantageous for the light to increase in brightness, but during dusk or early nightfall, an overly bright light might not be efficient and may unnecessarily reduce battery life. Accordingly, there is a need for an adjustable portable LED-based light system that provides improved functionality.

SUMMARY OF THE INVENTION

The present disclosure is directed to a portable lighting device having adjustable flashing speeds and brightness through the use of a microcontroller. Furthermore, the portable lighting device is configured to operate as a tail light for a bicycle, among many other suitable functions. More particularly, the functions include but are not limited to, serving as a bicycle light attachable to a frame of a bicycle to ensure that the rider is capable of being seen by other riders, pedestrians and/or motorists. Alternatively, the portable lighting device may be attached to a rider's clothing. Attachment to clothing is advantageous in situations where the bicycle is broken during a ride and the user may have to walk to the nearest pay phone, gas station, and the like without the bike. In yet another embodiment, the user may be able to use the portable lighting device without the attachment to clothing and/or bike. For example, a pedestrian hiker may be able to attach the light to a shoulder strap of a backpack and use the portable lighting device to ensure that he or she is capable of being seen by others at night.

In one aspect, the portable lighting device is a high-brightness LED lighting device specifically configured for cyclists. During use, the light is pointed toward the rear to warn motorist of the rider's presence. The light may comprise one or more high-brightness LEDs configured to output, for example, as little as 50 lumens and as much as 150 lumens, but preferably 70-90 lumens. The level of brightness and the expansive area illuminated may be suitable for being seen by others. In one configuration, the portable lighting device includes a light module powered by an internal battery pack, an attaching device configured to allow the portable lighting device to be attached to clothing or a seat post mount (e.g., a mounting bracket or a slot receiving a Velcro strap).

In another aspect, the portable lighting device may include an outside casing made of aluminum, plastic and or silicon and may feature multiple vent holes and scoops to allow airflow to cool the portable lighting device during use. The casing may provide structure to attach the electronics which control the light, the high-brightness LED and the regular-brightness LED used as indicator lights to inform the user whether the light is ON/OFF, the amount of battery life remaining, and so forth. In one example, one high-brightness LED and one indicator LED may be housed by the casing of the portable lighting device. The high-brightness LED may be focused by a collimator and reflector configured to provide a wide and far beam pattern. In addition, the casing may protect the lighting and electronic components from damaging elements such as rain, wind, sand and the like by employing one or more silicon seals in various locations. In another aspect, the housing or casing may further include a port configured to receive a power cable for recharging the internal battery.

The portable lighting device may further include external switches configured to allow a user to control and/or configure the functionality portable lighting device. In one example, two switches may be accessible to the user and may be placed on the same side as the high-brightness LED. In one aspect, one of the switches may be configured to control a portion of the functionality provided by the light, while the other switch may be configured to control the remaining functions. The switches may be connected to the circuit board of the portable lighting device and, based on the user input, may trigger the processor and/or memory to perform one or more corresponding functions. In one aspect, the circuit board may include a microcontroller which includes an electrically erasable programmable read-only memory (EEPROM). Advantageously, the EEPROM may function to save any settings and/or modes configured by the user such that the settings/modes do not need to be reset after the portable lighting device is turned off and then back on. In other words, the EEPROM retains a setting either default or user-programmed until the user chooses to re-program the setting.

In one embodiment, the light module is approximately 1½ inches wide, 2½ inches tall and 1¼ inches thick. The outer shell is composed of plastic, nylon, acrylic, and silicone parts. The front is a unique semi clear red plastic shell featuring a clear lens near the center of the body to focus the light. Light that is not focused through the clear lens is reflected by the internal reflector and is visible through the red plastic from the sides and the top of the light, adding visibility in these directions. The inside of the light module contains the battery, custom reflector, electronics that control the light, one high-brightness LED and one LED indicator. There may be a silicone button on the front of the light that corresponds to two switches inside the light. By pressing the left side of the silicone button, the first switch (Switch #1) may be triggered and by pressing the right side of the silicone button, the second switch (Switch #2) may be triggered. Switch #1 is the POWER button that turns the light on and off and scrolls between the different settings on the light. Switch #2 is the PROGRAMMING button that fine tunes the light output and or flash speed by gradually increasing or decreasing the brightness or flash speed of the light. There is a silicone cover at the bottom of the light that can be removed to reveal the USB charging port. The electrical components of the light include a microcontroller that has EEPROM, which allows this light to store data after the battery is unplugged from the light module so that whenever the user chooses that particular setting number, the re-configured settings are used in place of the default settings.

In one aspect, the indicator LEDs may designate whether the portable lighting device is being charged, is fully charged, or not charging.

The objects, features, aspects and advantages of the present disclosure, which are believed to be novel, are set forth with particularity in the appended claims. Moreover, these objects, features, aspects and advantages of the present disclosure will become apparent to those skilled in the art from the following detailed description, which, taken in conjunction with the annexed drawings, discloses a best mode.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 5A is a setting order chart illustrating an ordering of setting selection in accordance with one or more aspects described herein.

FIG. 5B is a diagram illustrating the various settings and tunings available in accordance with one or more aspects described herein.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
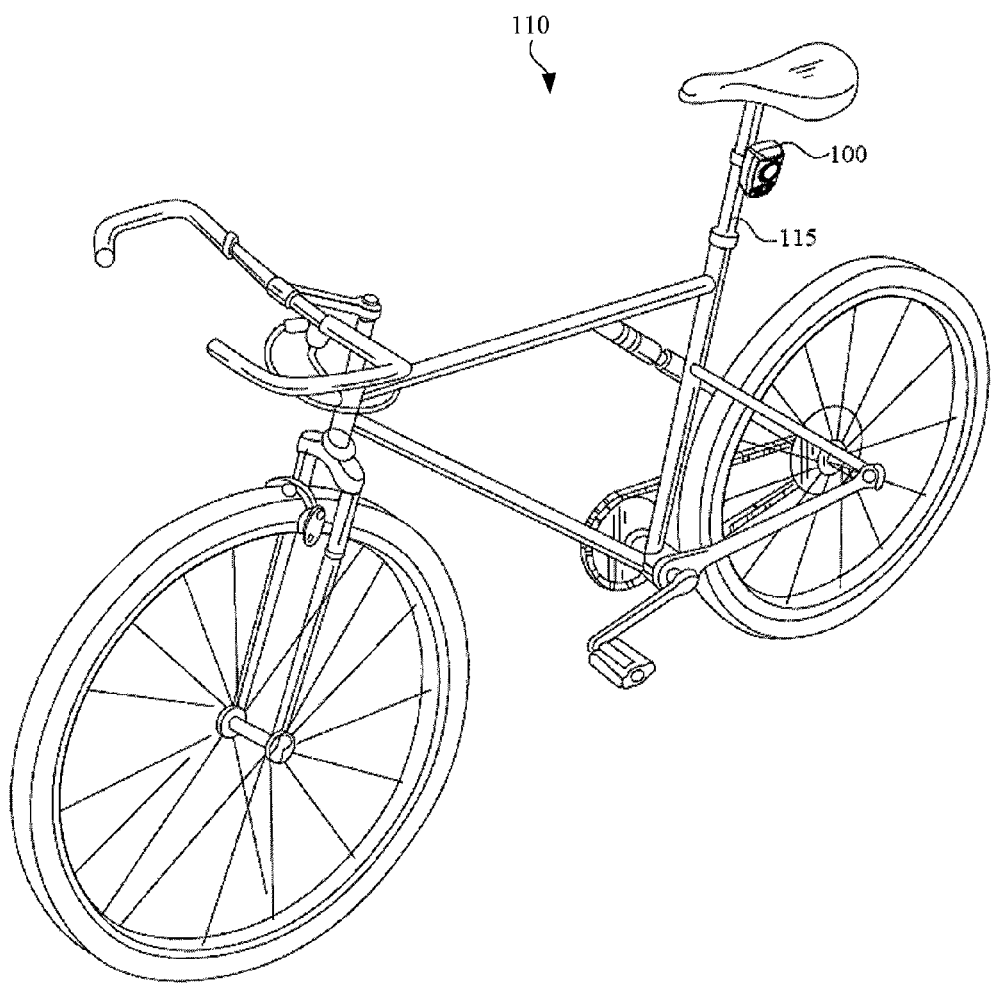
FIG. 1A illustrates an example of a portable lighting device attached to the seat post of a bicycle in accordance with one or more aspects described herein.
Figure 1B:
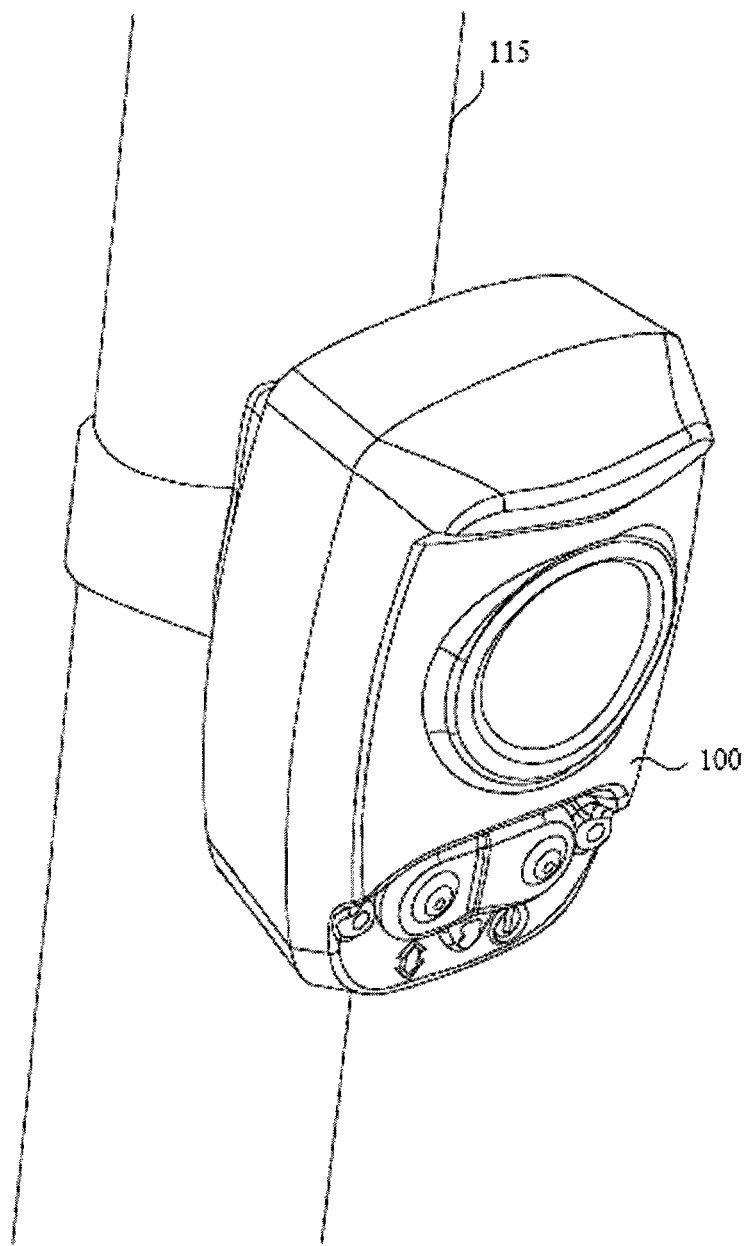
FIG. 1B is a close-up view of a portable lighting device attached to the seat post in accordance with one or more aspects described herein.

FIG. 1A illustrates an example of a portable lighting device 100 attached to bicycle 110. More particularly, the portable lighting device 100 is attached vertically along a bicycle seat shaft 115. As shown, the portable lighting device 100 is shown turned slightly angled for clarity. However, in operation, the portable lighting device would face and shine in a rear direction away from the rider, thereby making the rider visible to other riders, pedestrians, automobile drivers, and the like. In one alternative, the portable lighting device 100 may be anywhere else on the bicycle which allows it to shine in a rear direction. FIG. 1B illustrates a close up view of portable lighting device 100 mounted on the bicycle seat shaft 115.

Figure 2A:
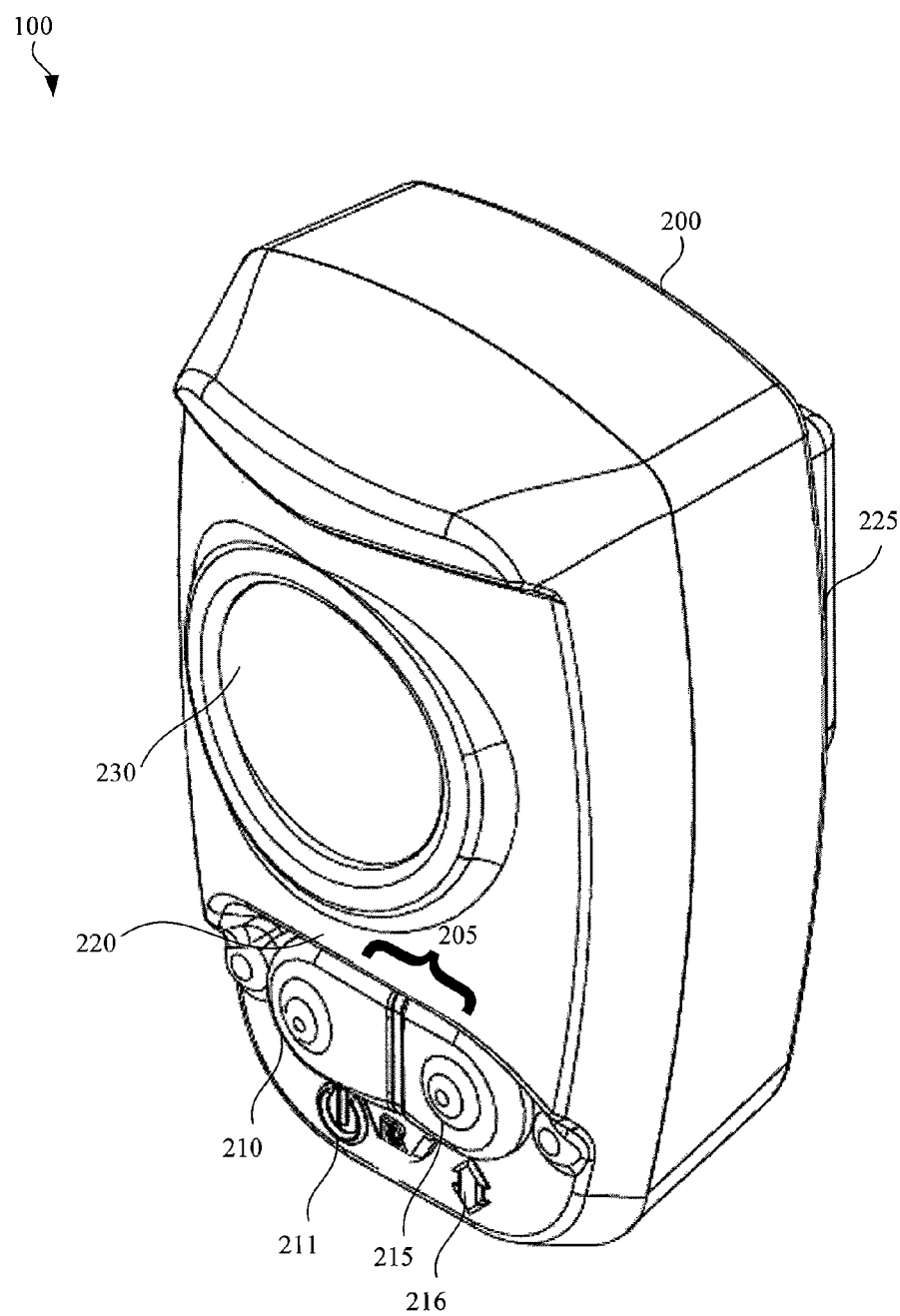
FIG. 2A is a top perspective view of a portable lighting device in accordance with one or more aspects described herein.

FIG. 2A is a front perspective view of the portable lighting device 100. In this embodiment, the battery used to power the portable lighting device 100 is integrated. As shown, housing 200 of the portable lighting device 100 is formed to fully encompass any circuitry required to operate portable lighting device 100. In one embodiment, the light module is approx 1½ inches wide, 2½ inches tall and 1¼ inches thick. The housing 200 may be composed of plastic, nylon, acrylic, and/or silicone parts. The front of the portable lighting device 100 as shown is a unique semi clear red plastic shell featuring a lens (e.g., a clear or translucent piece of plexiglass, glass or plastic) near the center of the body to focus the light. Light that is not focused through the clear lens is reflected by the internal reflector and is visible through the red plastic from the sides and top of the light, adding visibility in these directions. As tail lights are traditionally red, the red-colored plastic aids in providing a color recognizable with tail lights and further signal to other riders, pedestrians and drivers the presence of the bicycle, and more importantly, the rider of the bicycle. The inside of the light module contains the battery, custom reflector, electronics that control the light, one high-brightness LED and one LED indicator. Below is a button 205, subdivided into two portions, a left portion 210 and a right portion 215 usable to control operation of the portable lighting device 100.

Each of the left first portion 210 and the right second portion 215 may operate independently of each other and controls different functions of the portable lighting device 100 when pressed by the user. In one aspect, the button 205 may be implemented as any user input interface. For example, the button 205 may be a small, multi-directional joystick. In another example, the button 205 may be separated into two distinct buttons, each corresponding to one of the left first portion 210 and the right second portion 215 of the button 205. In one example, the left first portion 210 and the right second portion 215 may be raised to various heights and may be configured to be different shapes and sizes as one another such that the user may be able to determine which is the left first portion 210 and which is the right second portion 215 by quickly feeling the tops of the respective switches which have differently sized concentric circles. In addition, the user may be able to further distinguish the buttons by determining the raised levels of the respective switches and even by feeling the different shapes of the respective switches. However as shown, button 205 may have uniform topography, and in this embodiment, the user may distinguish the left first portion 210 and the right second portion 215 by understanding their positional relationship to one another. Alternatively or in addition, below the left first portion 210 is a raised power symbol 211 and below the right second portion 215 is a raised directional arrow symbol 216. Accordingly, the user may be provided visual indication as to which of the left first portion 210 and right second portion 215 is configured to perform what functions. Furthermore, since the symbols 211 and 216 are raised and positionally located right beneath their respective, corresponding left first portion 210 and right second portion 215 of the button 205, the user may be able to easily ascertain which portion of the button 205 is configured to perform which functions without having to look at the portable lighting device 100. Accordingly, the user can easily distinguish between the two portions 210 and 215 using any of the multiple distinguishing features. Furthermore, as the portable lighting device 100 is intended to operate on a bicycle controlled by a rider, the rider may only utilize one hand to operate the portable lighting device 100 (while keeping one hand on the steering bar) and both eyes on the path. Accordingly, the design of dividing button 205 into a left first portion 210 and a right second portion 215 advantageously provides safe operation of the portable lighting device 100 while the rider is riding the bicycle. Moreover, eliminating other operational buttons makes it less likely that the rider will press the wrong button or be overwhelmed the number of options or different pressable buttons. In this embodiment, due to the one-button design (e.g., button 205) with a left-flexing first portion (e.g., left portion 210) and a right-flexing second portion (e.g., right portion 215), full operation of the lighting is allowable while maximizing ease of use.

Above the button 205 and underneath the housing 200 on the front side of the portable light 100, may be an indicator LED 220. The indicator LED 220 may be a single LED or it may be comprised of more than one LEDs. The indicator LED 220 functions to provide battery charging information. For example, when the portable lighting device 100 is charging, the indicator LED 220 flashes, and when the portable lighting device 100 is fully charged, the indicator LED 220 is constant. And when the user disconnects the portable lighting device from the charger, the indicator LED 220 is off. The housing 200 may further include a permanently or semi-permanently attached mounting bracket 225. Alternatively, the bracket 225 may be located elsewhere on housing 200 such as on the bottom of housing 200. The portable lighting device 100 features silicone seals in several locations to make the module water tight and able to withstand use in any weather condition.

As shown in FIG. 2A, the front of the portable lighting device 100 includes a circular piece of clear or translucent material 230. The piece of clear or translucent material 230 allows the light from high intensity LED to shine through and signals the presence of the rider to other riders, pedestrians and drivers. The clear or translucent material 230 may be constructed out of glass, plastic or any other material known to provide protection to the high intensity LED while allowing the light to shine through with virtually no reduction in light intensity. While this embodiment utilizes only one high intensity LED, those skilled in the art will understand that multiple high intensity LEDs may be used as well behind the clear or translucent material 230.

Figure 2B:
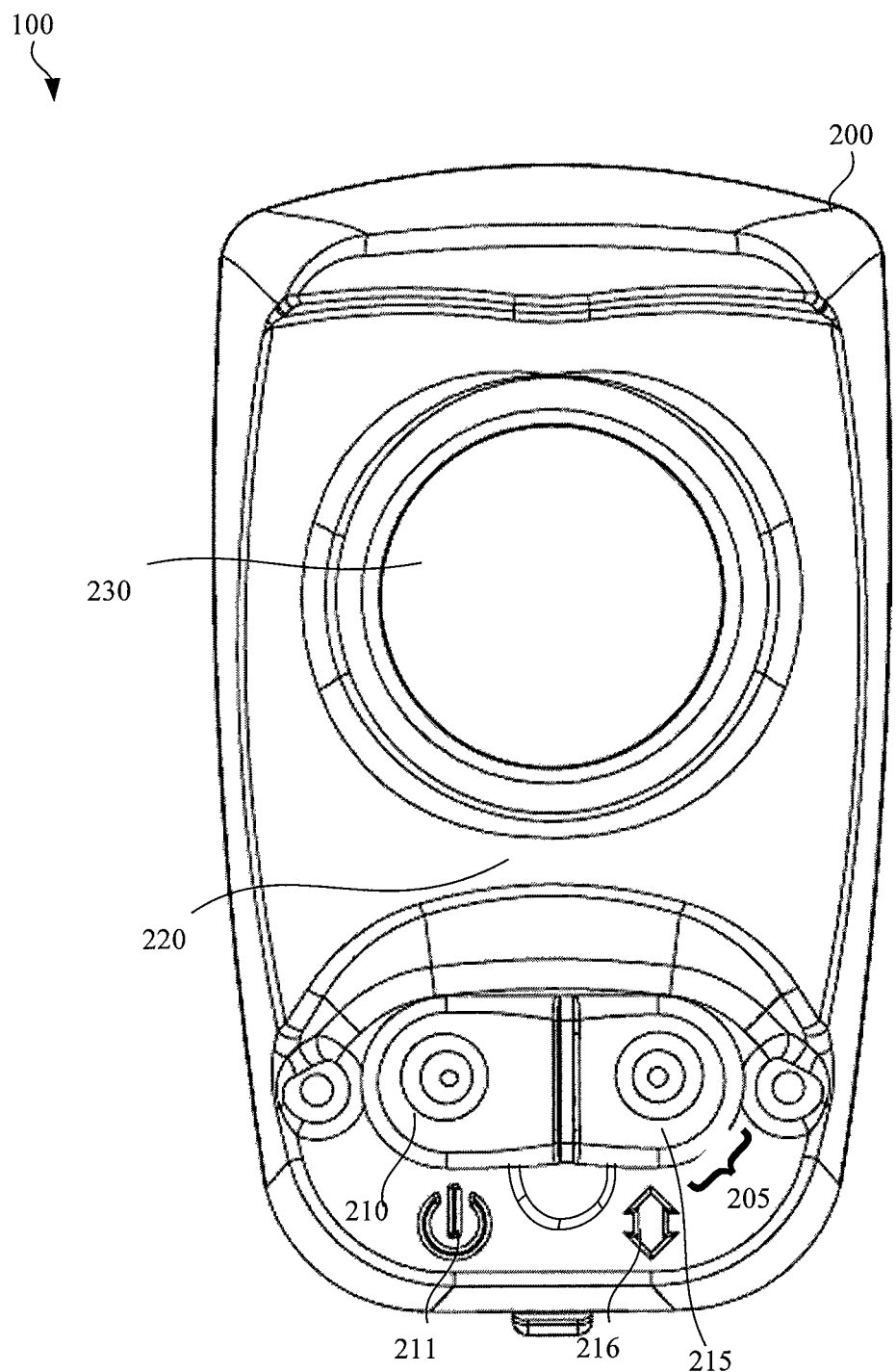
FIG. 2B is a front view of a portable lighting device in accordance with one or more aspects described herein.

FIG. 2B is a front view of portable lighting device 100. The high intensity or high brightness LED is positioned behind clear or translucent material 230. The high intensity LED featured in this light are a Cree brand, model XP series LED or equivalent LED from other LED manufacturers such as Nichia, etc. This high intensity LED is focused by a collimator and reflector to provide a narrow and far beam pattern. The clear or translucent material 230 is positioned near the middle of the front of the portable lighting device 100.

Figure 2C:
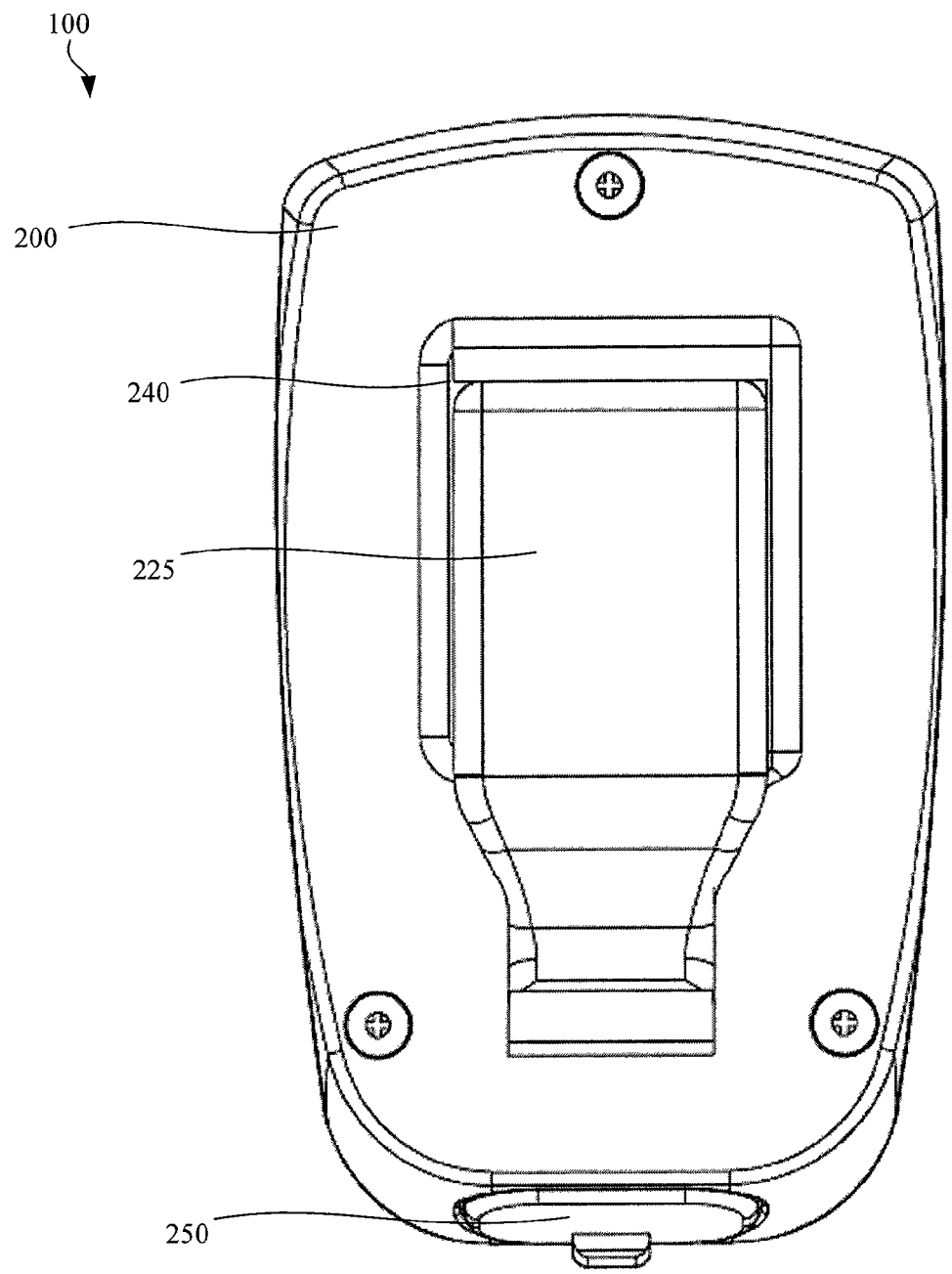
FIG. 2C is a back view of a portable lighting device in accordance with one or more aspects described herein.

FIG. 2C is a rear view of portable lighting device 100. Here, the mounting bracket 225 is illustrated to reside on the rear side of housing 200. In one example, the mounting bracket 225 is structurally attached to the housing 200 via attachment portion 240. In addition, there is a silicone cover 250 at the bottom of the portable lighting device 100 that can be removed to reveal a USB charging port usable to charge the internal battery of the portable lighting device 100.

Figure 2D:
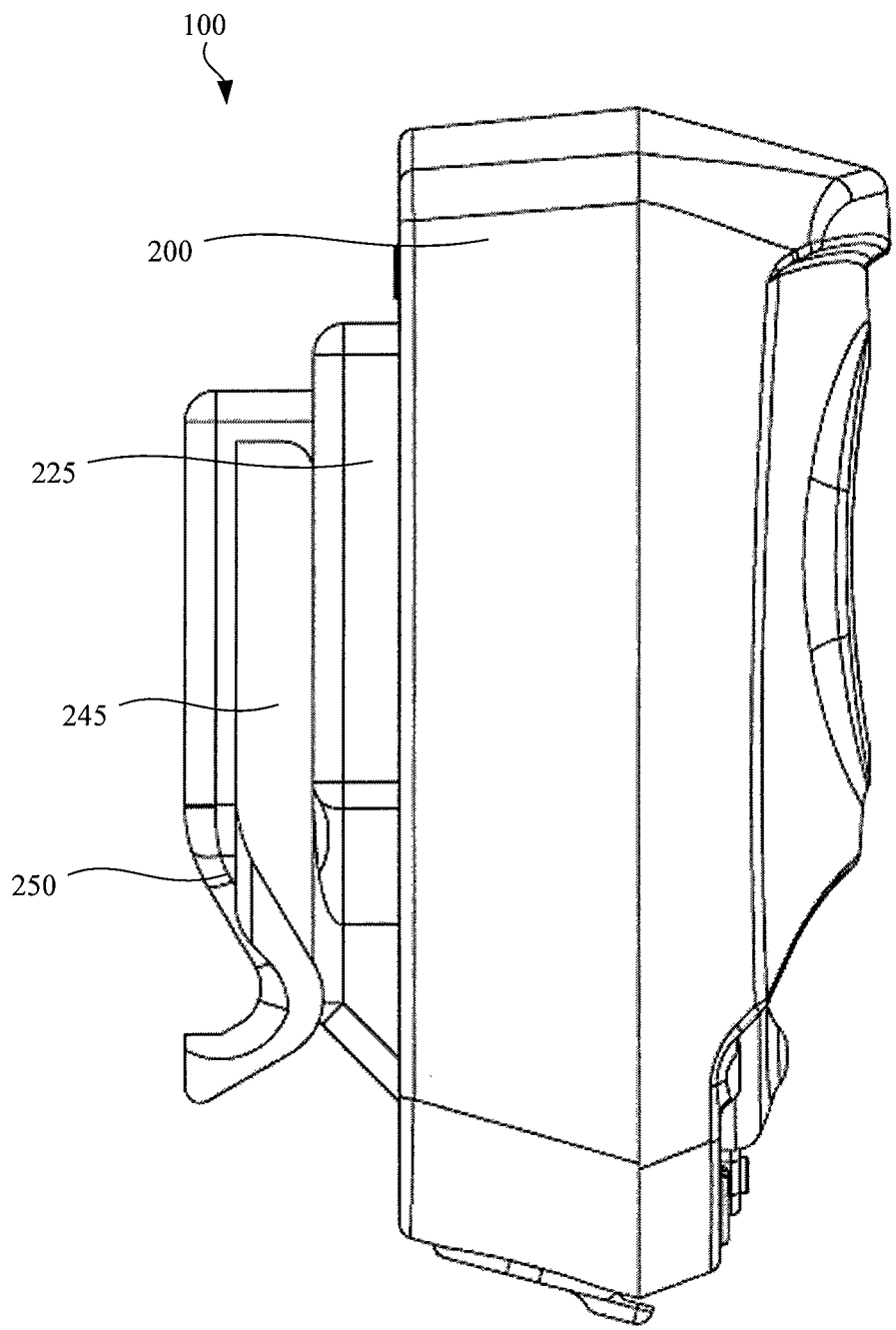
FIG. 2D is a left side view of a portable lighting device in accordance with one or more aspects described herein.
Figure 2E:
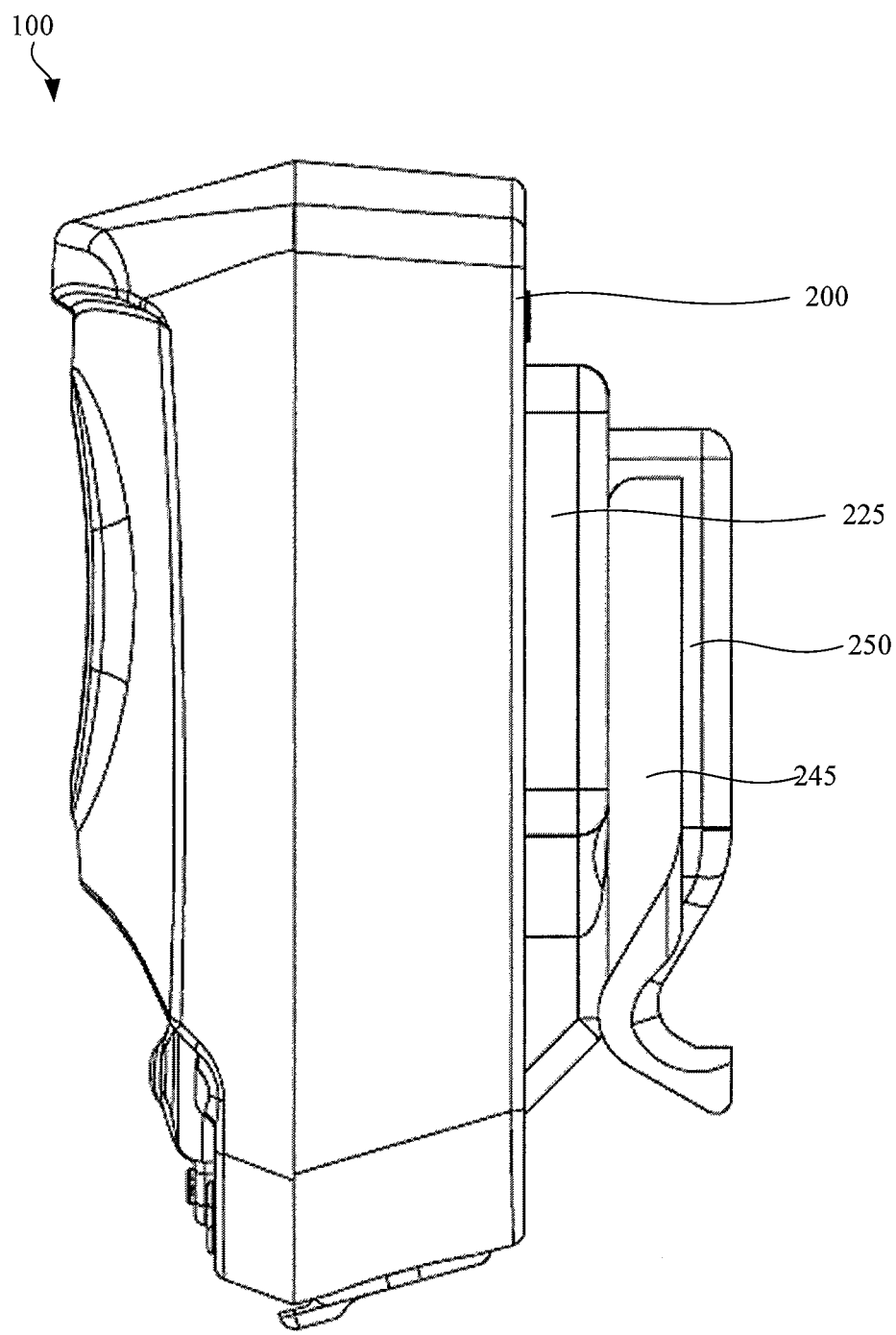
FIG. 2E is a right side perspective view of a portable lighting device in accordance with one or more aspects described herein.

FIGS. 2D and 2E are the respective side views of the portable lighting device 100. As shown, with one side of the mounting bracket 225 attached to the housing 200, a clip 250 is formed to create an opening 245 such that a strap (not shown) or other attaching piece can interact with the clip 250 at opening 245 to fasten the housing 200 of the portable lighting device 100 to the shaft of the bicycle seat or the rider's clothing. Any of the plurality other known ways to attach two objects may be substituted or used in connection with mounting bracket 225 (e.g., via Velcro).

Figure 2F:
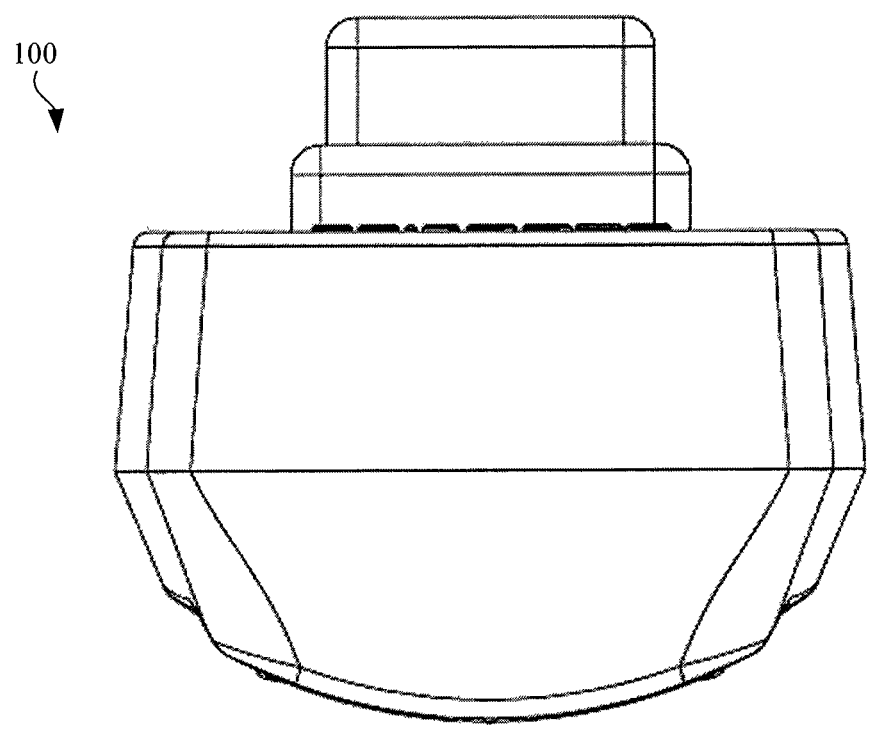
FIG. 2F is a top view of a portable lighting device in accordance with one or more aspects described herein.
Figure 2G:
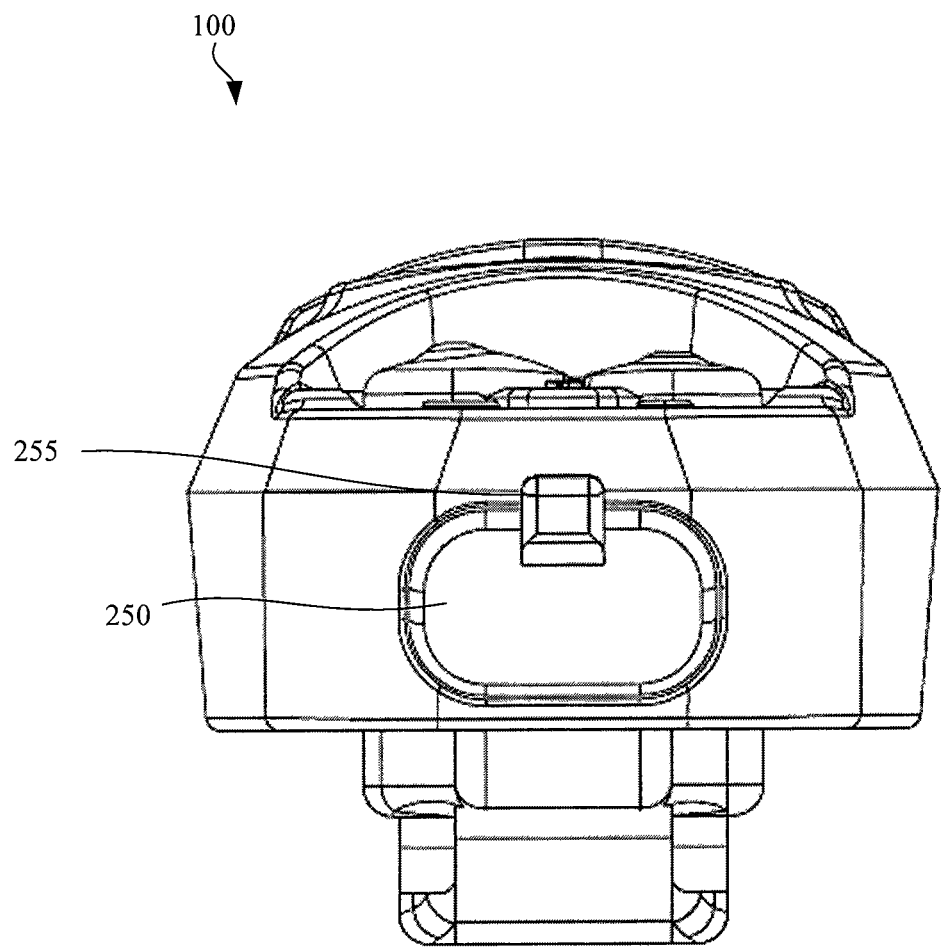
FIG. 2G is a bottom view of a portable lighting device in accordance with one or more aspects described herein.

FIG. 2F is a top view of the portable lighting device 100. FIG. 2G is a bottom view of the portable lighting device 100. As shown, portable lighting device 100 includes the silicone cover 250 at the bottom of the portable lighting device 100 that can be removed to reveal a USB charging port usable to charge the internal battery of the portable lighting device 100. The silicone cover 250 may have a tab 255 for easier user manipulation of the cover 250.

Figure 3:
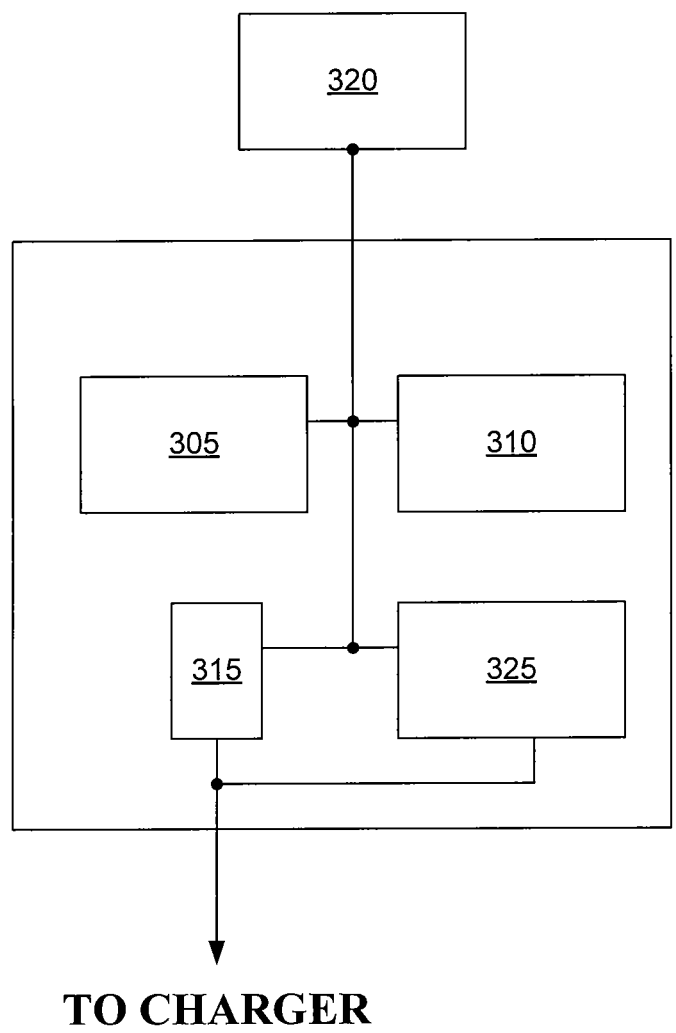
FIG. 3 is a block diagram of the controller in accordance with one or more aspects described herein.
Figure 4:
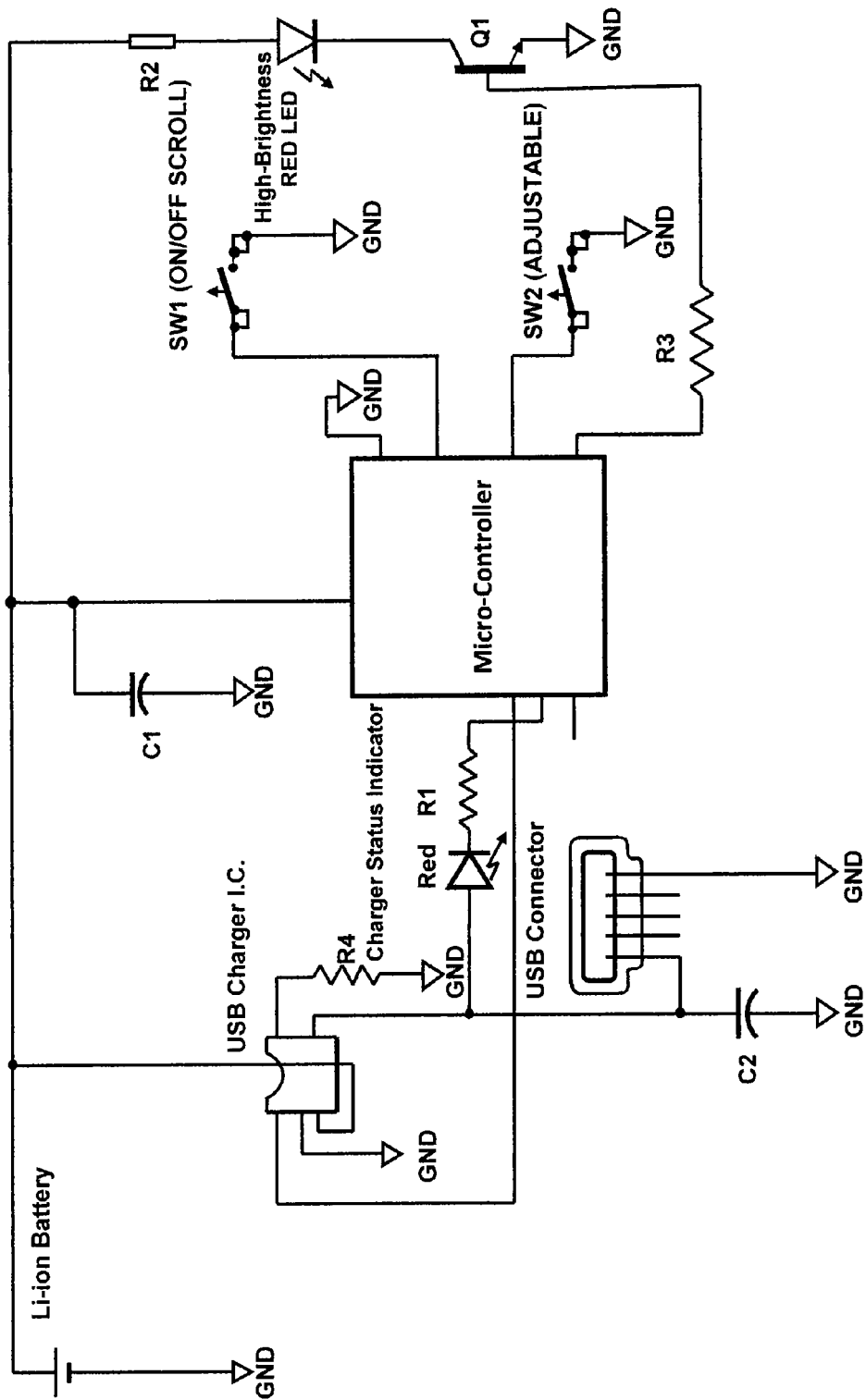
FIG. 4 is a schematic view of the circuitry of the portable lighting device in accordance with one or more aspects described herein.

FIG. 3 is a block diagram of the controller. In one aspect, the controller includes a microprocessor 305 coupled to a memory 310. Microprocessor 305 may be configured to execute commands stored in memory 310, and further configured to operate indicator LED 315 and high intensity LED 320 in response to user actuation of the left first portion 210 and the right second portion 215 of button 205 as shown in FIG. 2A. In one aspect, LED 315 is configured to be beneath clear or translucent shell 215 as shown in FIG. 2A, and the light of LED 315 shines through housing 200 to be visible to the user. Along the same vein, high intensity LED 320 may be behind clear or translucent lens 230 of FIG. 2A and may shine through the lens 230 and be visible to other pedestrians, riders and/or drivers. In one aspect, memory 310 may be a physical electrically erasable programmable read-only memory (EEPROM). In another aspect, memory 310 may be a flash memory. Advantageously, memory 310 may store programming code for operation of portable lighting device 100. For example, the memory 310 may store default settings for brightness and or flashing operation of the high intensity LED 320. However, when re-configured by a user pressing the left portion 210 and the right portion 215 of button 205 of FIG. 2A, memory 310 may store the newly configured settings for brightness and/or flashing operations of the high intensity LED 320. Memory 310 may store the reconfigured settings permanently until the user decides to re-configure the particular setting again. Turning portable light ON and OFF and/or removing the battery power might not impact the storage of the reconfigured settings within memory 310. In one aspect, memory 310 may include a duplicate storage of the default settings such that the user may re-call the default settings and reset portable lighting device 100 back to factory default settings and overwrite the reconfigured stored settings within memory 310. In one aspect, memory 310 comprises two memory storage devices, for example, an EEPROM and a separate random access memory (RAM). Alternatively, the RAM may be a separate memory device altogether (not shown). In addition, a battery 325 is integrated or coupled to the controller or circuit. The battery may be a single cell Lithium ion battery having a plastic connector to power the circuit board and other components of FIG. 3. As further shown in FIG. 3, the charger may be coupled to battery and LED 315. FIG. 4 is a detailed operating schematic view of one example of circuitry of portable lighting device 100.

The structure of the portable lighting device 100 having been described, attention will now turn to the functionality of the portable lighting device 100. Generally, the portable lighting device 100 may operate in any of a plurality of settings. For ease of understanding, in one embodiment, the portable lighting device 100 operates in any of five settings. However, within each setting, the portable lighting device 100 may be further customizably tuned.

For example, to operate the portable lighting device 100, the user can press the left first portion 210 of the button 205 to turn the high intensity LED on. The portable lighting device 100 will apply the most recently utilized setting. The user can press the power button 210 to scroll between the different operational settings. The sequence of the settings are illustrated in FIG. 5A. In any of these settings, the programming button 215 can be pressed and held to change the brightness, or flashing frequency, or flashing duty cycle, or number of superbright flashes per given dimmer flash. To turn the portable lighting device 100 off, the user can simply press and hold the left first portion 210 of the button 205 for over 1 second (e.g., between 1 and 6 seconds).

Unlike any other high-brightness LED tail lights for cycling, the preset flash settings on this light can be changed in 0.4% increments from 5% to 100% by the user while riding. In addition, the portable lighting device 100 uses different duty cycles for each different setting. The duty cycle for a particular setting could be changed in 0.4% increments from 5% to 100%. For example, the user can press and hold the right second portion 215 of the button 205, which acts as a control switch. While holding the right second portion 215 of the button 205 the flashing frequency, or flashing duty cycle, or number of superbright flashes per given dimmer flash will increase or decrease (in the constant setting the light output will dim or brighten). Any time the user releases the right second portion 215 of the button 205 then presses it again the light will increase or decrease in the opposite direction (in the constant setting the light output will dim or brighten in the opposite direction). The user can fine tune the preferred flash pattern by repeatedly pressing and/or holding the right second portion 215 of the button 205. Once the user determines the preferred output, he or she releases the right second portion 215 of the button 205 and the light automatically stores the flash speed for the particular setting in the EEPROM of the microcontroller. The user can scroll to the other settings and upon returning to the programmed setting the light will recall the setting the user previously set. Each of the settings for the portable lighting device 100 is programmable.

During use of the light, the user can re-program any of the settings. The user can also reset the programmed settings back to the manufacturer default setting. To reset the light back to the manufacturer default settings the user may press the left portion 210 of the button 205 for over 6 seconds while the portable lighting device is on. During this time the portable lighting device 100 will turn off then turn back on until the button is released. Once the button is released, the light settings are set to the manufacturer default settings and the portable lighting device will turn off.

The light uses the combination of program code and a microcontroller with an EEPROM to allow the user to customize the flash settings then save these settings data directly to the light without any additional equipment. The microcontroller's EEPROM gives the light the ability to store the customized duty cycles permanently, whether the power is on or off, or until the user decides to change this setting. This unique collaboration between the electronics, program code and microcontroller with EEPROM allows the portable lighting device 100 to be programmed during use and without the need of extra equipment.

FIG. 5B illustrates a setting and tuning chart which describes each of the five settings and how each setting may be tuned.

Figure 6A:
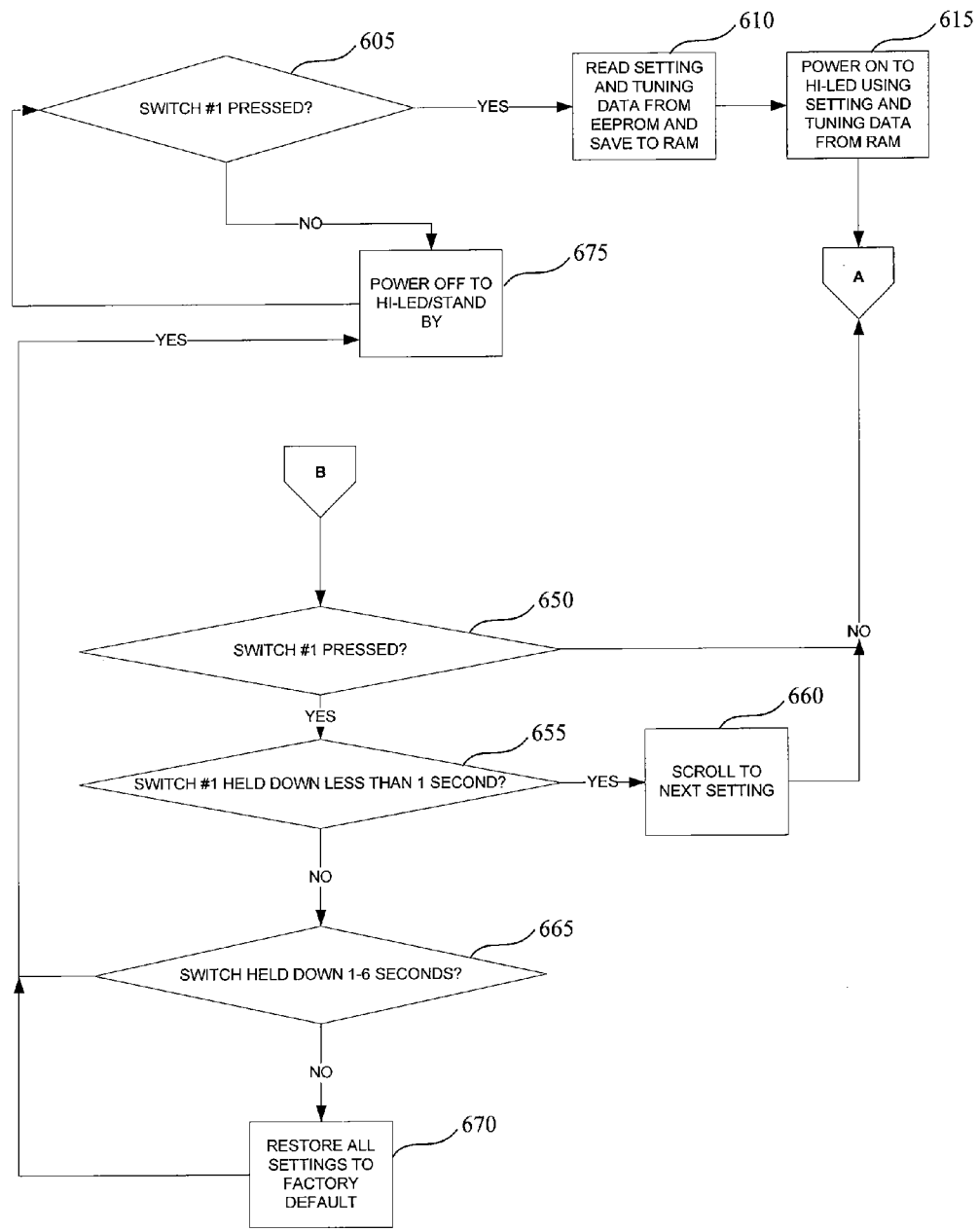
FIG. 6A is a flow chart illustrating the operation of the portable lighting device in accordance with one or more aspects described herein.
Figure 6B:
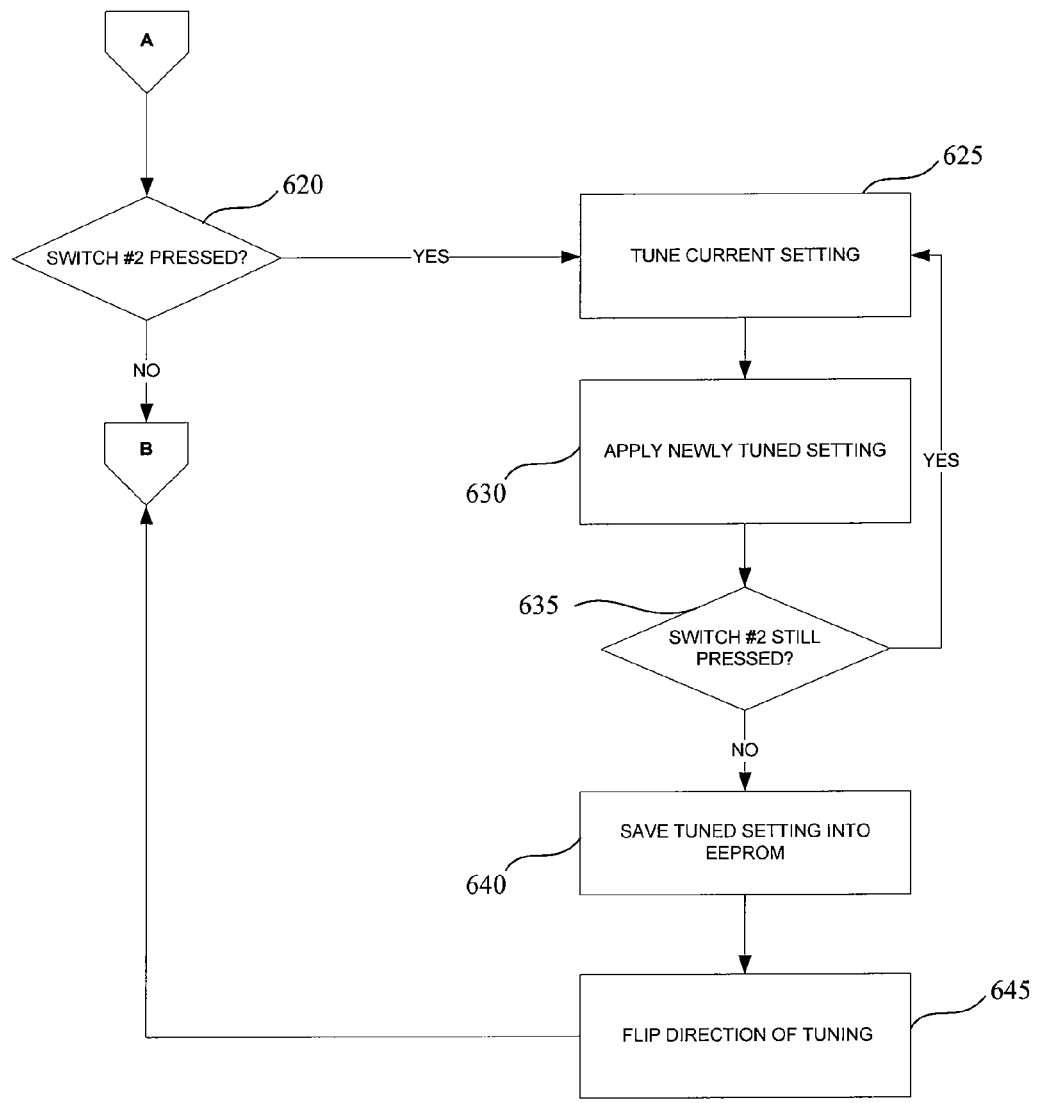
FIG. 6B is a flow chart illustrating the operation of the portable lighting device in accordance with one or more aspects described herein.

FIGS. 6A and 6B are flow charts illustrating an operation of the portable lighting device 100. As discussed above, SWITCH #1 corresponds to the left portion 210 of button 205 and SWITCH #2 corresponds to the right portion 215 of button 205. At step 605 of FIG. 6A, the portable lighting device 100 determines whether the user has pressed the left portion 210 of the button 205. If so, the setting and tuning data of the most recently utilized setting is read from the EEPROM and saved to the RAM at step 610. Otherwise, the portable lighting device 100 remains in the OFF state as indicated at step 675. Once the most recently utilized setting is read from the EEPROM and saved to the RAM at step 610, the high intensity LED is powered on using the most recently utilized setting at step 615. In other words, when turning the portable lighting device 100 on, the most recently utilized setting is re-applied.

Next, the operation moves to step 620 of FIG. 6B. Here, the portable lighting device 100 determines if SWITCH #2 is pressed. If not, the process will skip to step 650 of FIG. 6A, discussed infra. If however, SWITCH #2 is pressed, then at step 625 of FIG. 6B, the setting can be tuned at a predetermined increment (e.g., 0.4%). At step 630, the incrementally adjusted setting may be applied. At step 635, if SWITCH #2 continues to be held down, the process returns to step 625 and the setting is further incrementally adjusted. In this manner, holding down SWITCH #2 will allow the setting to be adjusted at the predetermined increment, but at a faster rate. However, if it is determined at step 635 that SWITCH #2 is no longer being pressed or held down, then at step 640, the incrementally adjusted setting may be saved into the EEPROM in place of the previous tuning of the setting. At step 645, the direction of tuning will be flipped, such that the next time SWITCH #2 is pressed or held down, tuning will be adjusted in the opposite direction (e.g., if the light was increasing in brightness upon each tuning, then after the change in the direction of tuning, the light will decrease in brightness for the next tuning, and so forth).

Next, the process returns to FIG. 6A and at step 650, the portable lighting device 100 determines if SWITCH #1 is pressed. If SWITCH #1 is not pressed, the process proceeds to step 620 of FIG. 6B to determine if SWITCH #2 is pressed. However, if SWITCH #1 is determined to be pressed at step 650, the portable lighting device 100 determines if SWITCH #1 is pressed for less than 1 second at step 655. If SWITCH #1 is pressed for less than 1 second, the portable lighting device 100 scrolls to the next setting at step 660 and then the process proceeds to step 620. However, if SWITCH #1 is not pressed for less than 1 second, the portable lighting device 100 determines if SWITCH #1 has been pressed for between 1-6 seconds at step 665. If so, the portable lighting device proceeds to step 675 and is powered off or placed into stand by mode. However, if the portable lighting device 100 determines that SWITCH #1 has been pressed for more than 6 seconds, then the tunings for each of the settings are erased and replaced with factory defaults for each of the settings. In this manner, the portable lighting device 100 may be operated.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this disclosure are described herein, including the best mode known to the inventor. Of course, variations on these described embodiments will become apparent to those of ordinary skill in the art upon reading the foregoing description. The inventor expects skilled artisans to employ such variations as appropriate, and the inventor intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, references may have been made to patents and printed publications in this specification. Each of the above-cited references and printed publications are individually incorporated herein by reference in their entirety.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments as disclosed so claimed are inherently or expressly described and enabled herein.

In closing, it is to be understood that the embodiments of the disclosure herein are illustrative of the principles described. Other modifications that may be employed are within the scope of the invention. Thus, by way of example, but not of limitation, alternative configurations of the present invention may be utilized in accordance with the teachings herein. Accordingly, the present disclosure is not limited to that precisely as shown and described.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A portable lighting device having adjustable flashing speeds and brightness through the use of a microcontroller, the portable lighting device operating as a tail light for a bicycle comprising:

a housing configured to fit in the palm of a hand, and further includes a slot for attachment to a portion of a bicycle frame or an article of clothing of a user;

a high brightness light-emitting diode (Hi-LED) contained within the housing;

one regular light-emitting diode (LED) contained within the housing;

electrical circuitry including the microcontroller and a memory, the electrical circuitry contained within the housing and configured to operate the Hi-LED and LED; and a button positioned on an exterior of the housing having a first portion configured to operate a first switch and a second portion configured to operate a second switch, the first switch for both powering on and powering off the Hi-LED and for switching between a plurality of settings of operation for the Hi-LED, and the second switch for tuning within each of the plurality of settings of operation for the Hi-LED, wherein the memory is configured to store the plurality of settings of operation for the Hi-LED, further wherein the memory is configured to be reprogrammable by a user to store the tuned setting within each of the plurality of settings of operation for the Hi-LEDs in response to the user operating the second switch, wherein one of the plurality of setting is a zoom setting where the Hi-LED gradually dims then brightens per duty cycle, and wherein tuning the zoom setting includes changing the speed of the duty cycle.

2. The portable lighting device of claim 1 further comprising:
a battery stored within the housing, the battery configured to power the electrical circuitry, the Hi-LED and the LED; and
a silicone cover removably attached for covering a charging port usable to charge the battery.

3. The portable lighting device of claim 1 wherein the memory is an electrically erasable programmable read-only memory (EEPROM).

4. The portable lighting device of claim 3, wherein the EEPROM is further configured to store instructions that when executed by the microcontroller causes the portable lighting device to return each of the plurality of settings and incrementally adjusted settings back to factory default settings in response to determining that a user is pressing and holding the first portion of the button located on the portable lighting device for a predetermined amount of time.

5. The portable lighting device of claim 3, wherein the EEPROM is further configured to store instructions that when executed by the microcontroller causes the portable lighting device to toggle between incrementally adjusting the brightness of the selected light setting in a first direction and incrementally adjusting the brightness of the selected light setting in a reverse direction in response to a user first releasing the second portion of the button to incrementally adjust the selected setting and then re-pressing and holding the second portion of the button to adjust in the reverse direction.

6. The portable lighting device of claim 1 wherein the memory is a RAM.

7. The portable lighting device of claim 1, wherein the LED is configured to be constantly on when the battery is fully charged, flashing when the battery is charging and off when the battery is not being charged.

8. The portable lighting device of claim 1, wherein one of the plurality of settings is a steady setting where the Hi-LED is constantly on, and wherein tuning the steady setting includes changing the brightness of the Hi-LED.

9. The portable lighting device of claim 1, wherein one of the plurality of settings is a triple setting where the Hi-LED flashes three times consecutively per cycle, and wherein tuning the triple setting includes changing the speed of the duty cycle.

10. The portable lighting device of claim 1, wherein one of the plurality of settings is a single setting where the Hi-LED flashes once per cycle, and wherein tuning the single setting includes changing the time between each flash.

11. The portable lighting device of claim 10, wherein incrementally adjusting the single setting includes incrementally increasing or decreasing the time between each flash of the Hi-LED between 5% and 100% of the maximum time between consecutive flashes.

12. The portable lighting device of claim 1, wherein one of the plurality of settings is a random setting where the Hi-LED flashes multiple times with a dim output and once in a high output per cycle, and wherein tuning the random setting includes changing the number of high output flashes per cycle.

13. The portable lighting device of claim 1, wherein incrementally adjusting one of plurality of settings includes incrementally increasing or decreasing brightness of the Hi-LED between 5% and 100% of the maximum brightness level of the Hi-LED.

14. The portable lighting device of claim 1, wherein incrementally adjusting the zoom setting includes incrementally increasing or decreasing speed of the duty cycle of the Hi-LED by 0.4% between 5% and 100% of the maximum duty cycle speed.

15. A portable lighting device having adjustable flashing speeds and brightness through the use of a microcontroller, the portable lighting device operating as a tail light for a bicycle comprising:
a housing configured to fit in the palm of a hand, and further includes a slot for attachment to a portion of a bicycle frame or an article of clothing of a user;
a high brightness light-emitting diode (Hi-LED) contained within the housing;
one regular light-emitting diode (LED) contained within the housing;
electrical circuitry including the microcontroller and a memory, the electrical circuitry contained within the housing and configured to operate the Hi-LED and LED; and
a button positioned on an exterior of the housing having a first portion configured to operate a first switch and a second portion configured to operate a second switch, the first switch for both powering on and powering off the Hi-LED and for switching between a plurality of settings of operation for the Hi-LED, and the second switch for tuning within each of the plurality of settings of operation for the Hi-LED,
wherein the memory is configured to store the plurality of settings of operation for the Hi-LED,
further wherein the memory is configured to be reprogrammable by a user to store the tuned setting within each of the plurality of settings of operation for the Hi-LEDs in response to the user operating the second switch, and
wherein the memory is further configured to store instructions that when executed by the microcontroller causes the portable lighting device to toggle the second portion between incrementally adjusting one of the flashing speed and the brightness of the selected light setting in a first direction and incrementally adjusting one of the flashing speeds and the brightness of the selected light setting in a reverse direction when the user releases the second portion of the button from incrementally adjusting the selected setting and then re-presses the second portion of the button to adjust in the reverse direction.

16. The portable lighting device of claim 15 wherein releasing the second portion of the button will automatically store the user's tuned setting.

* * * * *